(12) United States Patent
Zhu et al.

(10) Patent No.: US 10,702,949 B2
(45) Date of Patent: Jul. 7, 2020

(54) LASER CUTTING DEVICE

(71) Applicant: BOE Technology Group., Ltd., Beijing (CN)

(72) Inventors: Haibin Zhu, Beijing (CN); Xiaohu Li, Beijing (CN); Lu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 347 days.

(21) Appl. No.: 15/580,892

(22) PCT Filed: Jul. 6, 2017

(86) PCT No.: PCT/CN2017/092072
§ 371 (c)(1),
(2) Date: Dec. 8, 2017

(87) PCT Pub. No.: WO2018/006855
PCT Pub. Date: Jan. 11, 2018

(65) Prior Publication Data
US 2018/0345416 A1    Dec. 6, 2018

(30) Foreign Application Priority Data

Jul. 8, 2016    (CN) .......................... 2016 1 0537743

(51) Int. Cl.
*B23K 26/14*    (2014.01)
*B23K 26/38*    (2014.01)
*B23K 26/142*    (2014.01)

(52) U.S. Cl.
CPC .............. *B23K 26/38* (2013.01); *B23K 26/14* (2013.01); *B23K 26/142* (2015.10); *B23K 26/147* (2013.01)

(58) Field of Classification Search
CPC ...... B23K 26/38; B23K 26/142; B23K 26/14; B23K 26/147; B23K 26/123;
(Continued)

(56) References Cited

U.S. PATENT DOCUMENTS 4,319,120 A * 3/1982 la Rocca ................. B23K 26/12
219/121.6
6,144,010 A * 11/2000 Tsunemi ............... B08B 7/0042
219/121.68
(Continued)

FOREIGN PATENT DOCUMENTS

CN          2677079 Y       2/2005
CN         201931209 U      8/2011
(Continued)

OTHER PUBLICATIONS

English Translation of International Search Report and Box V of Written Opinion from International Patent Application No. PCT/CN2017/092072, dated Sep. 29, 2017, 6 pages.
(Continued)

*Primary Examiner* — Charles Cheyney
(74) *Attorney, Agent, or Firm* — Westman, Champlin & Koehler, P.A.

(57) ABSTRACT

A laser cutting device includes: a main body configured to emit a laser beam, a cutting point being formed at a position where the laser beam intersects a material to be cut; a gas blow pipe, of which a gas blow mouth configured to blow out a gas flow that is inclined to the laser beam, the gas flow capable of aiming at the cutting point; a gas suction pipe, of which a gas suction mouth being located downstream of a flowing direction of the gas flow, relative to the cutting point; the gas blow pipe and the gas suction pipe being attached respectively to the main body by means of an adjustment mechanism, such that positions of the gas blow pipe and the gas suction pipe are adjustable to adapt to change of a laser beam cutting route.

14 Claims, 3 Drawing Sheets

(58) Field of Classification Search
CPC . H01L 2224/45565; H01L 2224/45147; H01L 2924/00; H01L 2924/00014
USPC .... 219/121.84, 121.68, 121.67, 121.7, 121.6
See application file for complete search history.

(56) References Cited

U.S. PATENT DOCUMENTS

| | | | | |
|---|---|---|---|---|
| 6,531,682 | B1* | 3/2003 | Guttler | B23K 26/147 219/121.84 |
| 6,710,294 | B2* | 3/2004 | Lawson | B23K 26/147 219/121.69 |
| 9,102,009 | B2* | 8/2015 | Dackson | B23K 26/1476 |
| 9,945,253 | B2* | 4/2018 | Gutierrez, Jr. | B23K 26/123 |
| 10,201,871 | B2* | 2/2019 | Kadlec | B23K 10/00 |
| 2003/0127435 | A1* | 7/2003 | Voutsas | B23K 26/1435 219/121.65 |
| 2004/0182839 | A1 | 9/2004 | Denney et al. | |
| 2005/0224470 | A1* | 10/2005 | Burt | B23K 26/147 219/121.63 |
| 2013/0073071 | A1* | 3/2013 | Culp | B23K 26/083 700/108 |

FOREIGN PATENT DOCUMENTS

| | | |
|---|---|---|
| CN | 102319960 A | 1/2012 |
| CN | 202212697 U | 5/2012 |
| CN | 202411658 U | 9/2012 |
| CN | 103286445 A | 9/2013 |
| CN | 103586588 A | 2/2014 |
| CN | 203900736 U | 10/2014 |
| CN | 203992816 U | 12/2014 |
| CN | 204094308 U | 1/2015 |
| CN | 204867812 U | 12/2015 |
| CN | 205129180 U | 4/2016 |
| CN | 105618932 A | 6/2016 |
| CN | 107584209 A | 1/2018 |
| DE | 3801068 A1 | 7/1989 |
| JP | S57-184595 A | 11/1982 |
| JP | S60-154894 A | 8/1985 |
| JP | H05329679 A | 12/1993 |
| JP | H08187586 A | 7/1996 |
| JP | H09-248692 A | 9/1997 |
| JP | H09-271965 A | 10/1997 |
| JP | H10-99978 A | 4/1998 |
| JP | 2004-66517 A | 3/2004 |
| JP | 2016-162769 A | 9/2016 |

OTHER PUBLICATIONS

Second Office Action for Chinese Patent Application No. 201610537743.1, dated Mar. 7, 2019, 16 pages.

First Office Action, including Search Report, for Chinese Patent Application No. 201610537743.1, dated Oct. 17, 2018, 16 pages.

* cited by examiner

LASER CUTTING DEVICE

CROSS-REFERENCE TO RELATED APPLICATION

This application is a 371 National Stage application of International Application No. PCT/CN2017/092072, with an international filing date of Jul. 6, 2017, which has not yet published, and which claims priority to Chinese Patent Application No. 201610537743.1 filed on Jul. 8, 2016 in the State Intellectual Property Office of China, the present disclosures of which are hereby incorporated by reference in their entirety.

TECHNICAL FIELD

Embodiments of the present invention relate to the field of laser cutting, and particularly, to a laser cutting device.

BACKGROUND

Thin film products usually need to be cut apart after being manufactured, to obtain the required follow-up products. At present, laser cutting method is used to cut apart the thin film products. When flexible thin film material (also referred to as film material hereinafter) is in a laser cutting process, part of the material escapes in the form of gasified dusts, and part of the material splashes out as molten slag from the cutting line, causing lots of pollution particles around the cutting line. If these pollution particles are not removed promptly, they will be deposited immediately when encountering surface of the film material, resulting in large pollution that is difficult to be cleaned on the surface of the film material, thereby bringing seriously adverse effects on subsequent production process of thin film products (such as flexible organic light emitting semiconductor (OLED)), and thus reducing a production yield.

Accordingly, for the flexible thin film material used in optical electronics, display, semiconductor and other industries, it is an urgent need to provide a dust removal and purification device for laser cutting, which can not only ensure cutting effect but also effectively reduce pollution on both side regions of the cutting line of the film material, and which is especially suitable for cutting flexible thin film material.

SUMMARY

Embodiments of the present invention provide a laser cutting device, comprising: a main body configured to emit a laser beam, a cutting point being formed at a position where the laser beam intersects a material to be cut; a gas blow pipe, of which a gas blow mouth configured to blow out a gas flow that is inclined to the laser beam, the gas flow capable of aiming at the cutting point; a gas suction pipe, of which a gas suction mouth being located downstream of a flowing direction of the gas flow, relative to the cutting point; the gas blow pipe and the gas suction pipe being attached respectively to the main body by means of an adjustment mechanism, such that positions of the gas blow pipe and the gas suction pipe are adjustable to adapt to change of a laser beam cutting route.

In one embodiment, the gas blow pipe is configured to blow out the gas flow, and a gas of the gas flow comprises an inert gas.

In one embodiment, the gas suction mouth of the gas suction pipe is aimed at the cutting point.

In one embodiment, the adjustment mechanism comprises a turntable fitted over a periphery of the main body, and the gas blow pipe and the gas suction pipe are connected respectively to the turntable.

In one embodiment, the gas blow pipe comprises: a sloped tube equipped with the gas blow mouth, and an inlet pipe connecting the sloped tube and the turntable together; a central axis of the inlet pipe being parallel to the laser beam.

In one embodiment, the gas suction pipe comprises: a gas suction hood equipped with the gas suction mouth, and a gas exhaust pipe connecting the gas suction hood and the turntable together, a central axis of the gas exhaust pipe being parallel to the laser beam.

In one embodiment, the laser cutting device further comprises: a drive mechanism configured to drive rotation of the turntable, and a controller being in communication with the drive mechanism, the controller configured to control a motion of the drive mechanism according to a preset laser beam cutting route.

In one embodiment, the drive mechanism comprises: a reducing motor mounted to the turntable, a first gear mounted to an output shaft of the reducing motor; and a second gear mounted to the main body and engaged with the first gear.

In one embodiment, an angle adjusting mechanism is provided between the sloped tube and the inlet pipe.

In one embodiment, a cutting motion direction of the laser beam is opposite to the flowing direction of the gas flow blown out from the gas blow pipe.

In one embodiment, a metal probe is provided at the gas blow mouth of the gas blow pipe and is connected to a power source through a wire.

In one embodiment, a plurality of outwardly-extending support stands are provided at the gas blow mouth of the gas blow pipe, a support sleeve is mounted to outside ends of the support stands, and the metal probe passes through a central hole of the support sleeve.

In one embodiment, an absolute value of a gas pressure of a gas within the gas blow pipe is less than an absolute value of a gas pressure of a gas within the gas suction pipe.

In one embodiment, a bore diameter of the gas blow mouth of the gas blow pipe is less than a bore diameter of the gas suction mouth of the gas suction pipe.

In one embodiment, an annular groove is formed at a periphery of the main body; and the adjustment mechanism comprises: a first slider in a slide fit with the annular groove, the gas blow pipe being connected to the first slider; and a second slider in a slide fit with the annular groove, the gas suction pipe being connected to the second slider.

BRIEF DESCRIPTION OF THE DRAWINGS

Technical solutions according to embodiments of the present invention will be further described hereinafter with reference to the attached drawings. Obviously, these schematic views illustrated in the drawings are not drawn in scale, but present these features in a simply manner. Moreover, the drawings in the description hereinafter refer to only some of embodiments of the present invention, but not to limit the present invention.

DETAILED DESCRIPTION OF THE EMBODIMENTS

Figure 1:
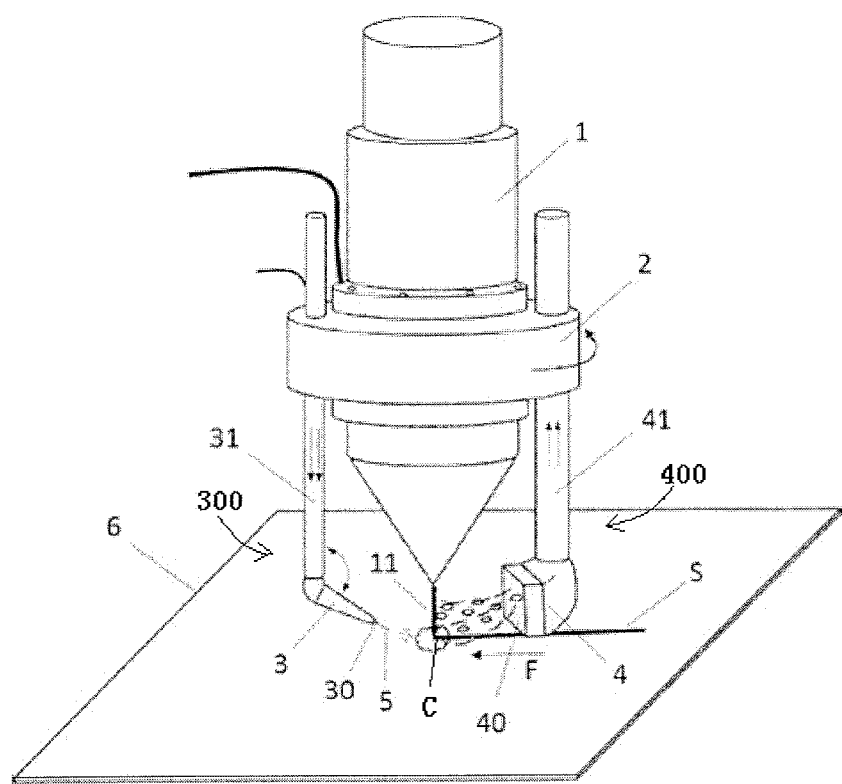
FIG. 1 is a schematic perspective view showing a working condition of a laser cutting device according to an embodiment of the present invention.

FIG. 1 is a schematic perspective view showing a laser cutting device according to an embodiment of the present invention.

The laser cutting device comprises a main body 1, a turntable 2, a gas blow pipe 300, a gas suction pipe 400 and other components. The laser cutting device is especially suitable for cutting the flexible thin film material used in optical electronics, display, semiconductor and other industries, and of course may also be for cutting other materials.

Specifically, the main body 1 is configured to emit a laser beam 11. The main body 1 is for example a focus lens outer tube, usually a passage for the laser beam 11 to pass through is provided inside the main body 1, and a central axis of the passage may be regarded to substantially coincide with a central axis of the laser beam 11. Referring to FIG. 1, the laser beam 11 intersects with a flexible thin film material to be cut (also referred to as film material 6 hereinafter) after vertically passing through the passage, the intersecting position forming a cutting point C.

The turntable 2 (corresponding to an adjustment mechanism) is rotatably fitted over a periphery of the main body 1. It may be understood in combination with FIG. 1, a rotation axis of the turntable 2 coincides substantially with the central axis of the laser beam 11. Rotation of the turntable 2 may be controlled manually, or may be controlled mechanically to achieve automatic adjustment of a rotation position of the turntable 2. The turntable 2, for example, may be mounted on the main body 1 to be fixed in an axial position with an axial limiting structure.

The gas blow pipe 300 having a gas blow mouth 30 usually is configured to be in fluidic communication with a high pressure gas source. Referring to FIG. 1, the gas blow pipe 300 is located at left side of the laser beam 11, and is attached to the main body 1 in a manner of being mounted to the turntable 2. The gas blow mouth 30 of the gas blow pipe 300 blows a high pressure gas flow towards a position of the cutting point located at lower right of the gas blow mouth 30, that is, a gas flow from the gas blow mouth 30 of the gas blow pipe 300 inclines relative to the laser beam 11 and is capable of aiming at the cutting point C. It can be understood by those skilled in the art that, the gas blow mouth 30 equivalently blows from the side towards the cutting point C, so that smoke and molten slag generated in the laser cutting process are broken away quickly from the film material 6, and heat dissipates from the film material 6 rapidly.

An exemplary configuration of the gas blow pipe is shown in the present embodiment. As shown in FIG. 1, the gas blow pipe 300 comprises: a sloped tube 3 equipped with the gas blow mouth 30, and an inlet pipe 31 connecting the sloped tube 3 and the turntable 2 together, a central axis of the inlet pipe 31 being parallel to the laser beam 11. It may be understood that, the sloped tube 3 and the inlet pipe 31 are in fluidic communication with the high pressure gas source, and the high pressure gas is blown out of the sloped tube 3 from the inlet pipe 31. The gas flow passage in the sloped tube 3 has a shape of truncated cone gradually tapered in a gas flow direction. Of course, in other embodiments, the gas blow pipe may also have other configuration, as long as it is capable of blowing a gas flow from the side of the laser beam 11 and aiming at the cutting point.

Referring again to FIG. 1, the gas suction pipe 400 having a gas suction mouth 40 is located at right side of the laser beam 11, and is attached to the main body 1 in a manner of being mounted to the turntable 2. Relative to the flow direction of the gas flow blown from the gas blow pipe 300, the gas suction mouth 40 of the gas suction pipe 400 is located downstream of the cutting point C. It can be understood that, the gas suction pipe 400 is usually configured for being in fluidic communication with a negative pressure system, to suck away the high pressure gas from the gas blow pipe 300 and pollution particles including smoke and molten slag generated in the laser cutting process quickly, so as to cool the cutting point region and prevent the pollution particles from being deposited on the film material 6. It can be understood that, the gas blow pipe 300 and the gas suction pipe 400 are arranged at interval of generally 180 degrees in a circumferential direction of the turntable 2, so that the gas blow pipe 300 and the gas suction pipe 400 are disposed substantially at opposite sides of the laser beam 11.

The gas suction pipe 400 and the gas suction mouth 40 may adopt any suitable configurations, and an exemplary configuration of the gas suction pipe is shown in the present embodiment. As shown in FIG. 1, the gas suction pipe 400 comprises: a gas suction hood 4 equipped with the gas suction mouth 40, and a gas exhaust pipe 41 connecting the gas suction hood 4 and the turntable 2 together, a central axis of the gas exhaust pipe 41 being parallel to the laser beam 11. It can be understood that, the gas suction hood 4 and the gas exhaust pipe 41 are in fluidic communication with the negative pressure system, to discharge the gas and the pollution particles suctioned by the gas suction hood 4 into the negative pressure system through the gas exhaust pipe 41. The gas flow passage in the gas suction hood 4 is gradually tapered in the gas flow direction. The gas suction mouth 40 may have a shape of a square (as shown in FIG. 1), a circle or other geometries. It can be understood that, configurations of the gas blow pipe and the gas suction pipe adopted in the present embodiment are beneficial to compact entire structure of the laser cutting device.

When the laser cutting device according to the present embodiment cuts a film material 6, by rotating the turntable 2, a blowing and suctioning gas flow formed between the gas blow pipe 300 and the gas suction pipe 400 disposed at opposite sides of the laser beam 11 can always adapt to changes of the laser beam cutting route, such that a projection of a flow direction of the blowing and suctioning gas flow onto the film material 6 has a portion substantially coinciding with straight-linear cutting line S in the film material 6 as far as possible. Forced directing of the blowing and suctioning gas flow on gasified dusts and molten slag generated in the laser cutting process is adopted such that the gasified dusts and the molten slag can be directed into the gas suction mouth 40 of the gas suction pipe 400 along the cutting line S, effectively reducing contamination of the pollution particles generated in the cutting process on both side regions of the cutting line S in the film material 6. In traditional laser cutting device, because the gas blow mouth is generally provided coaxially with the laser beam and the gas suction mouth is arranged in a circle around the cutting point, a blowing and suctioning gas flow formed between the gas blow mouth and the gas suction mouth takes the laser beam as a center of radiation, so that a circular pollution region with a center as which the cutting point serves is appeared on the film material 6. As a result, both side regions of the cutting line in the film material 6 are like to be contaminated by the pollution particles carried by the blowing and suctioning gas flow. However, with the laser cutting device according to the present embodiment, the above circular pollution region appeared on the film material 6 can be avoided effectively. It can be understood that, the laser cutting device according to the present embodiment is especially suitable for cutting thin film products having a straight-linear cutting edge.

In addition, in the present embodiment, the gas blow pipe 300 is configured in a structure to blow a gas flow from a side of the laser beam 11 to the cutting point. Compared with the traditional laser cutting device in which the gas blow pipe is configured in a structure to blow a gas flow coaxially with the laser beam to the cutting point, the gas blow pipe in the present embodiment can reduce depressed deformation and out-of-focus phenomenon of the film material 6 caused by suffering from vertical force, and ensure that the film material 6 is cut smoothly, guaranteeing cutting effect on the film material 6.

Traditional laser cutting device generally cuts a material in air environment. During cutting, high polymer thin film material is prone to be oxidized or even to be combusted due to existence of oxygen, and thus releases heat rapidly, which sharply increases molten slag, resulting in large amounts of pollution particles around the cutting line S. In order to alleviate this phenomenon, in the present embodiment, the gas in high pressure gas source is an inert gas, so that the gas blown out from the gas blow pipe 300 is the inert gas. In addition, because the gas blow mouth 30 of the gas blow pipe 300 aims at the cutting point, it allows the film material 6 located at the cutting point is generally in an oxygen-free environment isolated from oxygen, such that molten slag generated during the cutting of the high polymer thin film material can be reduced fundamentally. In one embodiment, the inert gas may be chosen from non-combustible gas or non-comburent gas. And, gas density of the inert gas is great than that of the air.

In order to direct the pollution particles generated during the cutting and carried by the blowing and suctioning gas flow into the gas suction pipe as soon as possible without any obstacles, in the present embodiment, as shown in FIG. 1, the gas suction mouth 40 of the gas suction pipe 400 also generally aims at the cutting point C. In addition, in order to achieve better suctioning effect so as to reduce pollution on the film material 6, on one hand, an absolute value of a gas pressure of the gas flowing within the gas blow pipe may be less than an absolute value of a gas pressure of the gas flowing within the gas suction pipe (the gas pressure within the gas suction pipe is negative), and on the other hand, a bore diameter of the gas suction mouth 40 of the gas suction pipe may be much greater than a bore diameter of the gas blow mouth 30 of the gas blow pipe. In addition, both the gas pressure of the gas within the gas blow pipe 300 and the gas pressure of the gas within the gas suction pipe 400 are adjustable, in order to be suitable for different cutting requirements.

In addition, in an updraft dust collecting hood of the traditional laser cutting device, due to structural restriction, the gas suction mouth is generally distanced far away from the cutting point, and thus has a poor suctioning effect on gasified dust, so the gasified dust is prone to fall onto the film material 6 since it is not suctioned and removed promptly. In the present embodiment, the gas suction pipe is disposed at a side of the laser beam 11, so that the gas suction mouth 40 of the gas suction pipe 400 aims at the cutting point C, which can reduce as far as possible a distance between the gas suction mouth 40 of the gas suction pipe 400 and the cutting point C (for example, the gas suction mouth 40 of the gas suction pipe is positioned downstream of the gas flow closely to the cutting point) so that the gasified dust can be suctioned rapidly into the gas suction pipe near-horizontally, thereby remarkably enhancing gasified dust suctioning effect and significantly reducing pollution caused by depositing the gasified dust on both side regions of the cutting line in the film material 6.

In addition, in the present embodiment, rotation of the turntable 2 is driven by a drive mechanism, the drive mechanism is in communication with a controller, and the controller is configured to control a motion of the drive mechanism according to a preset laser beam cutting route, so that angle of rotation of the turntable 2 can be adjusted automatically according to change of the laser beam cutting route (for example, the laser beam cutting route has a rectangular shape) at any time. This allows the blowing and suctioning gas flow to be always consistent automatically with the cutting line S, avoiding intersection between the blowing and suctioning gas flow and the cutting line S as far as possible. In one embodiment, a range of rotation of the turntable 2 may be set to be in a range of 0-360°, so that, once one round of cutting is finished, the turntable 2 can be controlled to rotate back to initial angle automatically, ready for a next round of cutting.

In the present embodiment, an implementation of the drive mechanism is also provided. The drive mechanism comprises: a reducing motor mounted to the turntable 2, a first gear mounted to an output shaft of the reducing motor; and a second gear mounted to the main body 1 and engaged with the first gear. The second gear, for example, may be an outer gear ring fitted over a periphery of the main body 1. In a laser cutting process, turning-on, as well as forward and reverse rotation, of the reducing motor is controlled by the controller, and then, by an engagement between the first gear and the second gear, automatic adjustment of the rotation position of the turntable 2 can be achieved.

Figure 2:
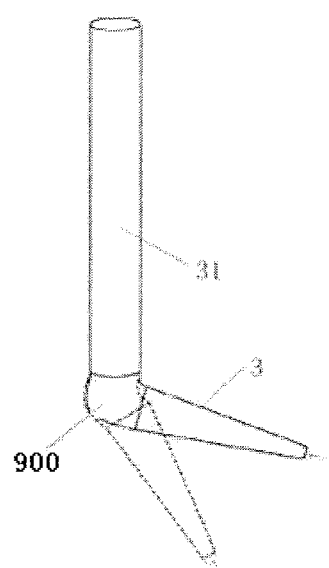
FIG. 2 is a schematic view showing an inlet pipe and a sloped tube according to the embodiment of the present invention.

In one embodiment, an angle adjusting mechanism 900 is provided between the sloped tube 3 and the inlet pipe 31, so that inclined angle of the sloped tube 3 can be adjusted. In this way, even if a distance between the main body 1 and the film material 6 varies, the sloped tube 3 always aims at the cutting point C. The angle adjusting mechanism may adopt a known configuration, such that the sloped tube 3 can be adjusted between a first position perpendicular to the laser beam 11 and a second position parallel to the laser beam 11. In FIG. 2, one positional condition of the sloped tube 3 is shown in solid line, while another positional condition of the sloped tube 3 is shown in dotted line.

In one embodiment, a cutting motion direction F of the laser beam 11 is opposite to a flow direction of the gas flow blown out from the gas blow pipe 300. That is, the gas blow mouth 30 of the gas blow pipe 300 is placed at an uncut region of the film material 6, while the gas suction mouth 40 of the gas suction pipe 400 is placed at a cut region of the film material 6. This can avoid non-uniformity of material thickness of the film material 6 at the preset cutting line within the uncut region of the film material 6, due to deposition of the pollution particles at the preset cutting line within the uncut region of the film material 6, thereby adversely affecting the cutting effect.

Figure 3:
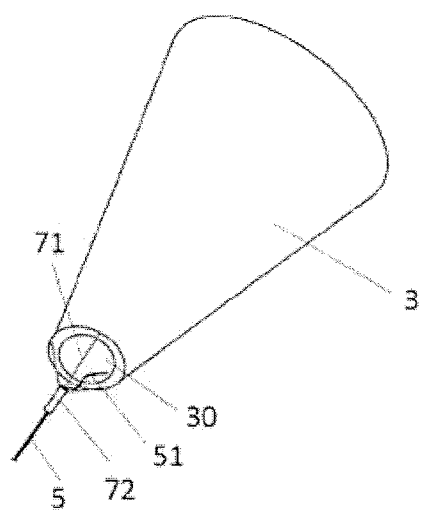
FIG. 3 is a schematic perspective view showing a metal probe and the sloped tube according to the embodiment of the present invention.

In addition, a metal probe 5 may be provided at the gas blow mouth 30 of the gas blow pipe 300, and the metal probe 5 is connected to a power source through a wire 51 and is configured to generate ionic wind through electrical discharge so as to eliminate static electricity occurred in the laser cutting process. An exemplary mounting configuration of the metal probe 5 is shown in FIG. 3. A plurality of outwardly-extending support stands 71 are provided at the gas blow mouth 30 of the gas blow pipe, a support sleeve 72 is mounted to outside ends of the support stands 71 for supporting the metal probe 5, and the metal probe 5 passes through a central hole of the support sleeve 72.

In conclusion, in the solution according to the embodiments of the present invention, one gas blow pipe and one gas suction pipe are provided on the turntable 2, and the gas blow pipe and the gas suction pipe are disposed at opposite sides of the laser beam 11 in order to achieve blowing the cutting point from the side and suctioning the cutting point from the side. The drive mechanism and the controller are used to adjust automatically rotation angle of the turntable 2 according to the laser beam cutting route, so that an inert protection gas blowing action of the gas blow pipe and a dust suctioning action of the gas suction pipe are always implemented along the cutting line S. In the way, under the action of forced directing of the blowing and suctioning gas flow, high temperature gasified dusts and molten slag flow along the cutting line, and are suctioned and removed promptly within the cut region at the rear of the cutting point. In addition, the gas blow pipe blows an inert protection gas to the cutting point, which can isolate the cutting point from oxygen, reduce splashed molten slag generated after the film material 6 is oxidized or even is combusted and releases heat rapidly, and reduce deformation and out-of-focus phenomenon of the film material 6 caused by suffering from vertical force. It has been proven by experiments that, the laser cutting device according to the embodiments of the present invention not only has a better cutting effect but also significantly alleviates a problem that both side regions of the cutting line in the film material 6 are polluted, compared with traditional laser cutting device.

Figure 4:
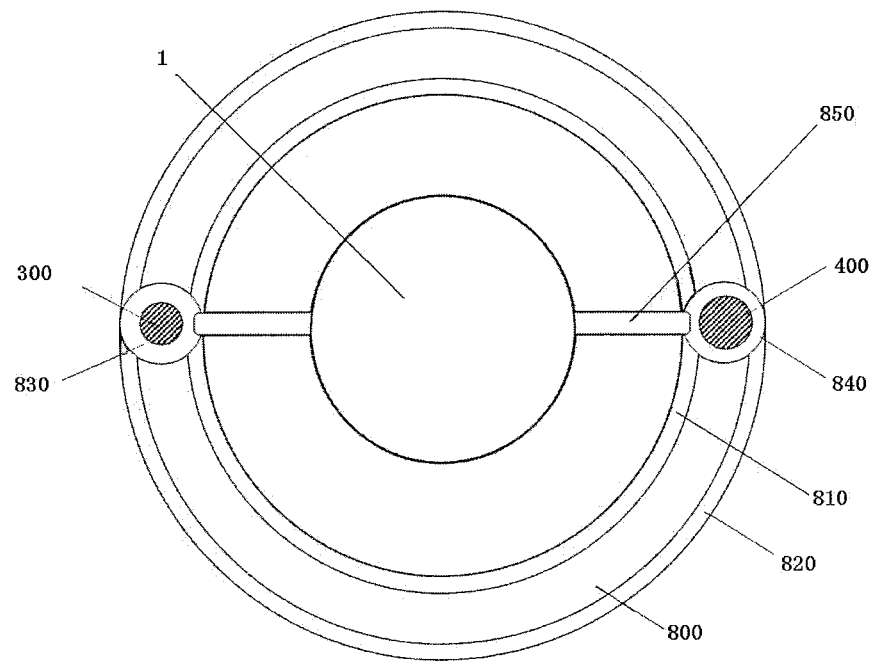
FIG. 4 is a schematic sectional view showing an adjustment mechanism according to another embodiment of the present invention.

It should be noted that, in the above embodiments of the present invention, the gas blow pipe and the gas suction pipe are attached respectively to the main body 1 by means of the turntable 2, such that positions of the gas blow pipe and the gas suction pipe can be changed by rotating the turntable 2, so that the blowing and suctioning gas flow can always adapt to change of the laser beam cutting route, alleviating a phenomenon that pollution particles generated in the cutting process spread out towards both side regions of the cutting line. It can be understood that, in another embodiment, other adjustment mechanisms may be adopted to change positions of the gas blow pipe and the gas suction pipe on the main body 1, which also achieve an effect that the blowing and suctioning gas flow between the gas blow pipe and the gas suction pipe always adapts to change of the laser beam cutting route. For example, in an embodiment that is illustrated and shown in FIG. 4, an annular groove 800 defined by an inner slide rail 810 and an outer slider rail 820 may be formed at the periphery of the main body 1; and the adjustment mechanism comprises a first slider 830 and a second slider 840 in a slide fit with the annular groove 800, the first slider 830 and the second slider 840 are respectively connected to the main body 1 through a connection rod 850, the gas blow pipe 300 is connected to the first slider 830, and the gas suction pipe 400 is connected to the second slider 840. By adjusting positions of the first slider 830 and the second slider 840 in the annular groove 800, positions of the gas blow pipe and the gas suction pipe can be changed, to adapt the blowing and suctioning gas flow to change of the laser beam cutting line.

The above are merely exemplary embodiments of the present invention, but not to limit the present invention. For those skilled in the art, any changes and modifications on the device according to the present invention can be made without departing from the scope of the present invention. Other embodiments can be obtained when those skilled in the art consider the disclosure of the present description. The present description and the examples should be regarded as being illustrative, and the scope of the present invention is defined in the claims and their equivalents.

What is claimed is:

1. A laser cutting device, comprising:
   a main body configured to emit a laser beam, a cutting point being formed at a position where the laser beam intersects a material to be cut;
   a gas blow pipe, of which a gas blow mouth is configured to blow out a gas flow that is inclined to the laser beam, the gas flow capable of aiming at the cutting point;
   a gas suction pipe, of which a gas suction mouth is located downstream of a flowing direction of the gas flow, relative to the cutting point;
   wherein the gas blow pipe and the gas suction pipe are attached respectively to the main body by an adjustment mechanism, such that positions of the gas blow pipe and the gas suction pipe are adjustable to adapt to change of a laser beam cutting route;
   wherein an annular groove is formed at a periphery of the main body; and
   wherein the adjustment mechanism comprises: a first slider in a slide fit with the annular groove, the gas blow pipe being connected to the first slider; and a second slider in a slide fit with the annular groove, the gas suction pipe being connected to the second slider.

2. The laser cutting device of claim 1, wherein, the gas blow pipe is configured to blow out the gas flow, and a gas of the gas flow comprises an inert gas.

3. The laser cutting device of claim 1, wherein, the gas suction mouth of the gas suction pipe is aimed at the cutting point.

4. The laser cutting device of claim 1, wherein, the adjustment mechanism comprises a turntable fitted over a periphery of the main body, and the gas blow pipe and the gas suction pipe are connected respectively to the turntable.

5. The laser cutting device of claim 4, wherein, the gas blow pipe comprises: a sloped tube equipped with the gas blow mouth, and an inlet pipe connecting the sloped tube and the turntable together; a central axis of the inlet pipe being parallel to the laser beam.

6. The laser cutting device of claim 5, wherein, the gas suction pipe comprises: a gas suction hood equipped with the gas suction mouth, and a gas exhaust pipe connecting the gas suction hood and the turntable together, a central axis of the gas exhaust pipe being parallel to the laser beam.

7. The laser cutting device of claim 4, wherein, the laser cutting device further comprises: a drive mechanism configured to drive rotation of the turntable, and a controller being in communication with the drive mechanism, the controller configured to control a motion of the drive mechanism according to a preset laser beam cutting route.

8. The laser cutting device of claim 7, wherein, the drive mechanism comprises: a reducing motor mounted to the turntable, a first gear mounted to an output shaft of the reducing motor; and a second gear mounted to the main body and engaged with the first gear.

9. The laser cutting device of claim 5, wherein, an angle adjusting mechanism is provided between the sloped tube and the inlet pipe.

10. The laser cutting device of claim 1, wherein, a cutting motion direction of the laser beam is opposite to the flowing direction of the gas flow blown out from the gas blow pipe.

11. The laser cutting device of claim 1, wherein, a metal probe is provided at the gas blow mouth of the gas blow pipe and is connected to a power source through a wire.

12. The laser cutting device of claim 11, wherein, a plurality of outwardly-extending support stands are provided at the gas blow mouth of the gas blow pipe, a support sleeve is mounted to outside ends of the support stands, and the metal probe passes through a central hole of the support sleeve.

13. The laser cutting device of claim 1, wherein, an absolute value of a gas pressure of a gas within the gas blow pipe is less than an absolute value of a gas pressure of a gas within the gas suction pipe.

14. The laser cutting device of claim 1, wherein, a bore diameter of the gas blow mouth of the gas blow pipe is less than a bore diameter of the gas suction mouth of the gas suction pipe.

* * * * *